Oct. 12, 1943.  F. R. HEINICK  2,331,322

NUT ANCHOR

Filed Jan. 23, 1941

INVENTOR.
Frederick R. Heinick,
BY
Attorney.

Patented Oct. 12, 1943

2,331,322

UNITED STATES PATENT OFFICE 2,331,322

NUT ANCHOR

Frederick R. Heinick, Los Angeles, Calif., assignor, by mesne assignments, to Lester E. Hutson, Los Angeles, Calif.

Application January 23, 1941, Serial No. 375,550

2 Claims. (Cl. 85—32)

This invention has for its primary object the production of a nut anchor which will hold a nut securely in place and prevent turning during and after the act of connecting a bolt, screw, rod or other connection thereto. Another object is the production of a nut anchor which will hold a nut in place on a support so that the threaded shank of the fastener may be more easily adjusted to the nut after the fastener is applied and the nut is protected from damage. Among still further objects are simplicity and inexpensive construction and the saving of time, labor and expense in assembling and fabrication work such as in the construction of air planes, automobiles and many other types of work. By anchoring the nut in place on the work the assembling of parts is facilitated and time and expense are reduced to a minimum. Also my improved anchor permits the use of different types of nuts in the same device without alteration in design or construction.

Figure 1:
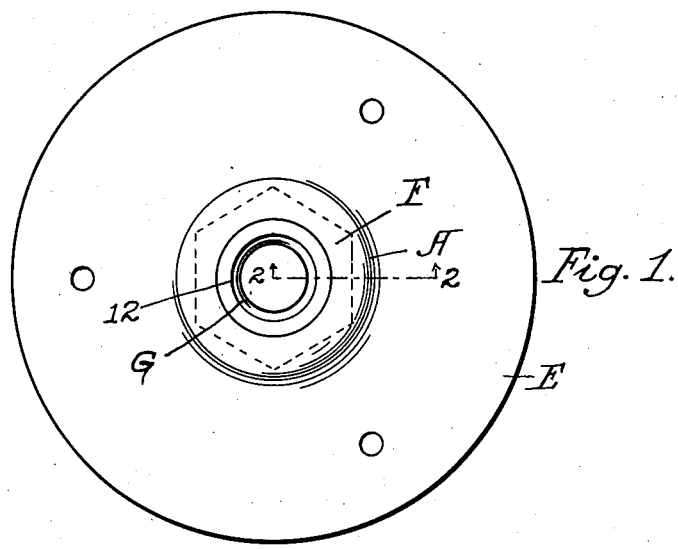
Figure 2:
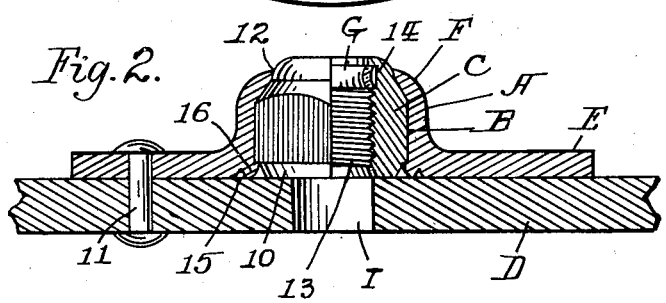
Figure 5:
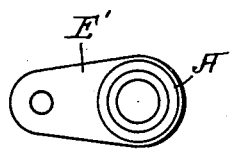
Figure 4:
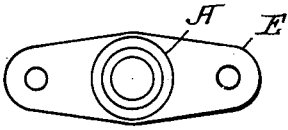
Figure 6:
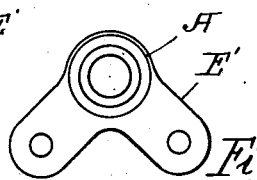
Figure 3:
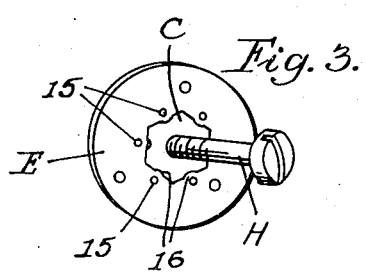
Figure 7:
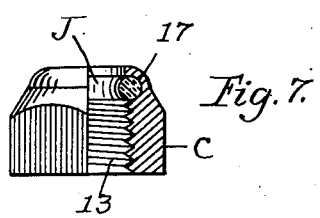

In the drawing, forming part of this specification, Fig. 1 is a plan on an enlarged scale of one form of my invention, showing one type of nut anchored therein; Fig. 2 is a section taken on the line 2—2 of Fig. 1, showing the nut anchoring shell secured on a fragment of a plate and a portion of the nut in full side elevation; Fig. 3 is a perspective view on a reduced scale looking at the back of the nut anchor when removed from its support and showing a nut retained therein with a bolt in engagement therewith; Figs. 4, 5 and 6 are plans of modified forms of my improved nut anchor, and Fig. 7 is a side elevation partly in vertical section of a nut of modified form with which my improved nut anchor is adapted to cooperate.

My improved nut anchor consists of a comparatively thin shell or housing A having a socket or recess B, to receive and securely hold a nut C of corresponding shape, style and size. As shown in Figs. 1 to 3 inclusive, the nut has a body portion of hexagonal shape and the socket B corresponds internally both in shape, style and size so that the nut when inserted in the socket is held firmly against turning with its base 10 planted against the surface of a support such as a plate D. Externally the shape of the shell A conforms approximately with the configuration of the nut. The nut shell A is formed with an integral radiating supporting flange E, which as shown in Figs. 1 to 3 inclusive is circular in shape and projects outwardly from the base portion of the shell. This flange is fastened by rivets such as 11 or other suitable means to the supporting plate D. The outer end of the anchor shell A is struck inwardly to form an inwardly directed and outwardly tapering annular shoulder F which engages over and holds the outer end of the nut, with the latter protruding through the opening 12, to retain the nut firmly in the socket with its base resting against the surface of plate D. As shown the nut has the usual thread 13. At one end portion of the nut is an inner resilient locking or clinching annulus G seated in an annular groove 14 in the nut and composed of compressed fiber or other suitable resilient material. This spring annulus jam lock for preventing the fastener from unintentional unscrewing is concavo convex in cross sectional shape as shown in Fig. 2, with its convex surface projecting inwardly so as to depress and spring firmly against the threads of the shank of a bolt such as H or other fastener when the latter is screwed into the nut. Normally the convex portion of the annulus projects into the path of the shank of the bolt so that the threads of the bolt or other fastener cut partly into the annulus and also compress it against tension. The resulting outward spring tendency of the annulus produces a stronger and more effective clinch or jam and prevents unintentional unscrewing of the fastener which is secured to the nut. The supporting plate D is provided with an opening I below the socket B to receive the end of the threaded shank of the bolt or other fastener and guide the same into engagement with the threads of the nut. In use the nut may when desired but not necessarily be fastened in the socket before the anchor is attached to the supporting plate D by suitable means. As shown in Figs. 2 and 3 the means referred to consists of striking the point of a tool at spaced intervals, such as indicated at 15, bordering the inner end of the socket so as to form engaging lips 16 over the rim of the inner end of the nut. The anchor may be employed without any fastening means such as the lips 16 when desired.

The flange F tapers outwardly and is circular in cross section to correspond with the configuration of the nut and to hold the latter more securely. The supporting flange E may be variously modified as indicated at E', in Figs. 4 to 6 inclusive, or any other design. The type of nut may be varied as preferred with or without nut locking means. As shown in Fig. 7 the nut locking or jam element resembles an annulus J of circular cross sectional shape closely seated in a corresponding annular groove 17, in which construction the clutching action is due principally to the compression of the material constituting the annulus and resiliency is not augmented by structural design as with the form of annulus shown in Figs. 1 to 3 inclusive. While the structure shown in the drawing is illustrated for use by inserting the bolt or other fastener through an opening I in the supporting plate D, the end of the fastener may be screwed into and secured through the outer end of the nut and the opening I dispensed with. In the latter event the nut locking annulus may be fastened at or near the opposite end of the nut from that illustrated. Various other modifications are contemplated within the spirit of the invention and within the scope of the following claims.

I claim:

1. An anchor for holding a nut having a flat sided body and a forwardly extending bulbous end of less cross sectional area than that of said body, and comprising a thin anchor shell having a flat sided body band to prevent the nut from rotating and a thin tapering forward annular end forming an inner forwardly extending annular shoulder corresponding substantially with said nut in size, shape and style internally to engage and hold the nut firmly in said shell, and said shell having an opening in its forward end through which said bulbous end of the nut is adapted to extend forwardly, a supporting base on the body of said shell, and means for fastening said shell to a supporting plate, said body band having its plate engaging end open so that the nut may be inserted therethrough, the nut face and shell surface being in substantial alignment so that the nut may directly engage the plate.

2. An anchor for holding a nut having a flat sided body and a threaded bore, comprising, an anchor shell having a thin flat sided body band to prevent the nut from rotating and an inner annular shoulder substantially corresponding with said nut internally to hold the nut firmly in said shell, and said shell having an opening in its forward end within said annular shoulder over the bore of the nut, a supporting base on the body of said shell, and means for fastening said base to a supporting plate, said body band having its plate engaging end open so that the nut may be inserted therethrough, the nut face and shell surface being in substantial alignment so that the nut may directly engage the plate.

FREDERICK R. HEINICK.